US010579177B2

(12) United States Patent
Ma

(10) Patent No.: US 10,579,177 B2
(45) Date of Patent: Mar. 3, 2020

(54) OLED TOUCH PANEL WITH REDUCED THICKNESS AND METHOD FOR MANUFACTURING THE SAME

(71) Applicant: BOE TECHNOLOGY GROUP CO., LTD., Beijing (CN)

(72) Inventor: Weixin Ma, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/992,896

(22) Filed: May 30, 2018

(65) Prior Publication Data

US 2019/0187848 A1    Jun. 20, 2019

(30) Foreign Application Priority Data

Dec. 15, 2017   (CN) .......................... 2017 1 1348524

(51) Int. Cl.
*G06F 3/041* (2006.01)
*G06F 3/044* (2006.01)

(52) U.S. Cl.
CPC .......... *G06F 3/0412* (2013.01); *G06F 3/0445* (2019.05); *G06F 3/0446* (2019.05); *G06F 2203/04103* (2013.01)

(58) Field of Classification Search
CPC .... G06F 3/0412; G06F 3/0445; G06F 3/0446; G06F 2203/04103
See application file for complete search history.

(56) References Cited

U.S. PATENT DOCUMENTS

| 8,743,077 | B1* | 6/2014 | Sprague | ................ G06F 1/1643 345/1.1 |
| 2004/0212603 | A1* | 10/2004 | Cok | ...................... G06F 3/0412 345/175 |
| 2015/0084006 | A1* | 3/2015 | Ivanov | .................. G06F 3/0412 257/40 |
| 2017/0125495 | A1* | 5/2017 | Lee | ..................... H01L 27/3246 |

* cited by examiner

*Primary Examiner* — Laurence J Lee
(74) *Attorney, Agent, or Firm* — Calfee, Halter & Griswold LLP

(57) ABSTRACT

Disclosed is an OLED touch panel and a method for manufacturing the same. The OLED touch panel includes an array substrate structure, a cathode layer with a plurality of cathode structures, an insulating layer and a metal layer with a plurality of metal structures, the cathode structures and the metal structures arranged such that the OLED touch panel exhibits a thinner profile than touch panels previously known in the art.

14 Claims, 3 Drawing Sheets

OLED TOUCH PANEL WITH REDUCED THICKNESS AND METHOD FOR MANUFACTURING THE SAME

CROSS REFERENCE

This application is based upon and claims priority to Chinese Patent Application No. 201711348524.X, filed on Dec. 15, 2017, the entire contents thereof are incorporated herein by reference.

TECHNICAL FIELD

The present disclosure relates to an OLED touch panel and a method for manufacturing the OLED touch panel.

BACKGROUND

In the OLED touch panel of the related art, a touch module is basically re-attached to the outside of the OLED touch panel such that a touch function can be achieved, which causes a thickness of the OLED touch panel to be increased, and light transmittance to be decreased, and also cost of the OLED touch panels to be increased.

The information as disclosed in the Background merely serves to enhance understanding of the background of the present disclosure.

SUMMARY

According to one aspect of the present disclosure, there is provided with an OLED touch panel. The OLED touch panel includes an array substrate structure, a cathode layer, an insulating layer and a metal layer. The cathode layer is disposed on the array substrate structure and includes a plurality of first cathode structures spaced from each other. The insulating layer is disposed on the cathode layer. The metal layer is disposed on a side of the insulating layer far away from the cathode layer. The metal layer includes a plurality of first metal structures spaced from each other. A projection of the first cathode structure on the array substrate structure at least partially coincides with a projection of the first metal structure on the array substrate structure.

According to one implementation of the present disclosure, the cathode layer includes a plurality of second cathode structures spaced from each other, the second cathode structure has a first extension direction, and the first cathode structure is disposed on the second cathode structure; and/or the metal layer includes a plurality of second metal structures spaced from each other, the second metal structure has a second extension direction, the first extension direction is disposed at an angle to the second extension direction, and the first metal structure is disposed on the second metal structure.

According to one implementation of the present disclosure, each of the second cathode structure and the second metal structure are in a bar shape.

According to one implementation of the present disclosure, in the first extension direction, a size of the first cathode structure is equal to a size of the second cathode structure; and/or in the second extension direction, a size of the first metal structure is equal to a size of the second metal structure.

According to one implementation of the present disclosure, each of the first cathode structure and the first metal structure are in a bar shape.

According to one implementation of the present disclosure, in the first extension direction, a size of the first cathode structure is smaller than a size of the second cathode structure; and a plurality of the first cathode structures are disposed on the second cathode structure, and are disposed sequentially in the first extension direction; and/or in the second extension direction, a size of the first metal structure is smaller than a size of the second metal structure; and a plurality of the first metal structures are disposed on the second metal structure, and are disposed sequentially in the second extending direction.

According to one implementation of the present disclosure, each of the first cathode structure and the first metal structure are in a block shape.

According to one implementation of the present disclosure, the first extension direction of the second cathode structure is perpendicular to the second extension direction of the second metal structure.

According to one implementation of the present disclosure, the cathode layer is made of a magnesium silver alloy.

According to one implementation of the present disclosure, the OLED touch panel further includes an integrated circuit, and the first cathode structure and the first metal structure are electrically connected to the integrated circuit, respectively.

According to one implementation of the present disclosure, the first metal structure includes two titanium film layers spaced from each other and an aluminum film layer located between the titanium film layers, and planes wherein the titanium film layer and the aluminum film layer are disposed are parallel to a plane where the cathode layer is disposed.

According to one implementation of the present disclosure, the metal layer is formed by using a physical vapor deposition process and a photolithography process.

According to another aspect of the present disclosure, a method for manufacturing an OLED touch panel, wherein the method for manufacturing the OLED touch panel includes following steps:

forming a first cathode structure on an array substrate structure;

forming an insulating layer on the first cathode structure; and forming a metal layer on the insulating layer.

According to one implementation of the present disclosure, the step of forming a first cathode structure on an array substrate structure includes: forming the first cathode structure on the array substrate structure by using a mask and by means of a vapor evaporation.

According to one implementation of the present disclosure, the step of forming a metal layer on the insulating layer includes: forming a metal layer on the insulating layer by using a physical vapor deposition process, and then using photolithography process such that the metal layer is formed to have a first metal structure.

According to one implementation of the present disclosure, the method further includes:

providing an integrated circuit, wiring on the cathode layer and the metal layer, respectively, such that the first cathode structure and the first metal structure are electrically connected to the integrated circuit, respectively.

BRIEF DESCRIPTION OF THE DRAWINGS

The various objects, features and advantages of the present disclosure will be apparent from the following detailed description of the preferable embodiments taken in conjunc

DETAILED DESCRIPTION

Now, the exemplary embodiments will be described more fully with reference to the accompany drawings. However, the exemplary embodiments can be implemented in various forms and should not be construed as limited to the embodiments set forth herein. Instead, these embodiments are provided so that this disclosure will be thorough and complete, and the concept of the exemplary embodiment will fully be conveyed to those skilled in the art. Same reference signs denote the same or similar structures in the accompany drawings, and thus the detailed description thereof will be omitted.

Figure 1:
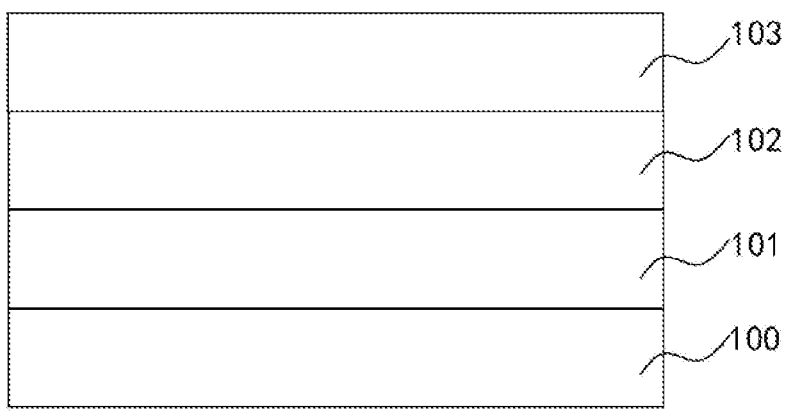
- FIG. 1 is a side view of an OLED touch panel according to an exemplary implementation.
Figure 2:
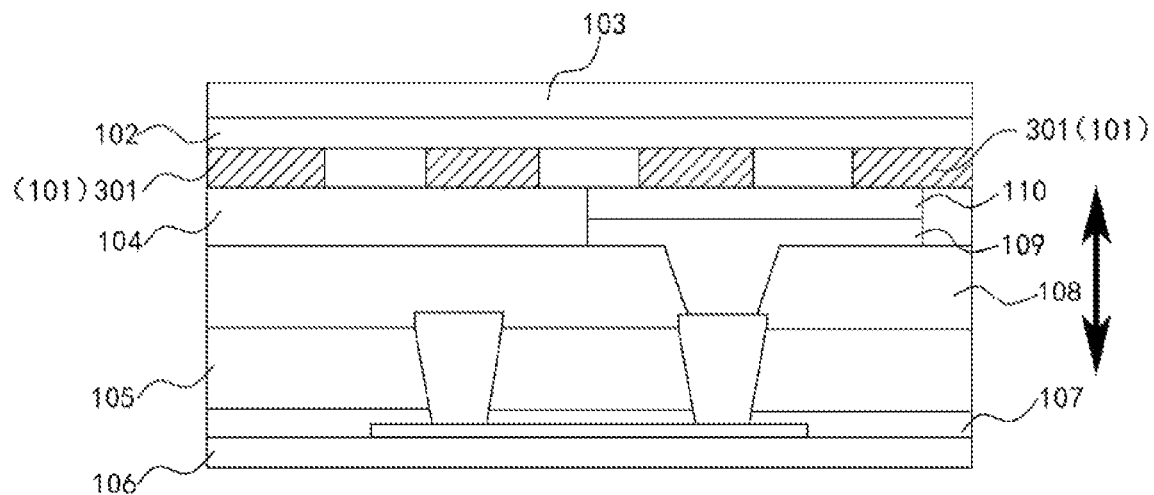
FIG. 2 is a side view of an OLED touch panel according to an exemplary implementation.
Figure 3:
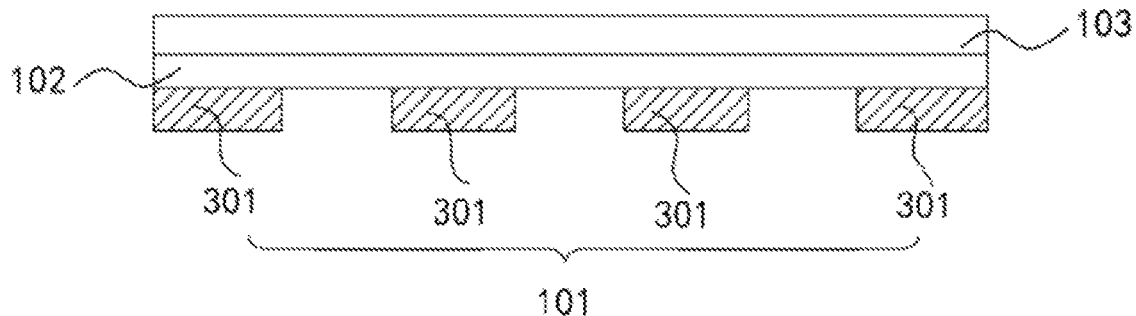
FIG. 3 is a partial enlarged view of a cathode layer and a metal layer in FIG. 2.

Referring to FIG. 1 to FIG. 5, according to one aspect of the present disclosure, there is provided with an OLED touch panel, which includes an array substrate structure 100. A cathode layer 101 may be provided on one side of the array substrate structure 100, as shown in FIG. 1 and FIG. 2, an insulating layer 102 may be disposed on the cathode layer 101, and a metal layer 103 may be disposed on a side of the insulating layer 102 that is far away from the cathode layer 101. The array substrate structure may further include a glass substrate 106, for example, the glass substrate 106 located on the bottom as in FIG. 2, and the cathode layer 101 may be indirectly disposed on the glass substrate 106. According to one specific implementation of the present disclosure, a GI dielectric layer 107, an ILD dielectric layer 105, a planarization layer 108, a pixel defining layer 104, a light emitting layer 110, and an anode layer 109 may be also disposed between the glass substrate 106 and the cathode layer 101. The cathode layer 101 may be disposed on a side of the pixel defining layer 104 that is far away from the glass substrate 106.

Figure 5:
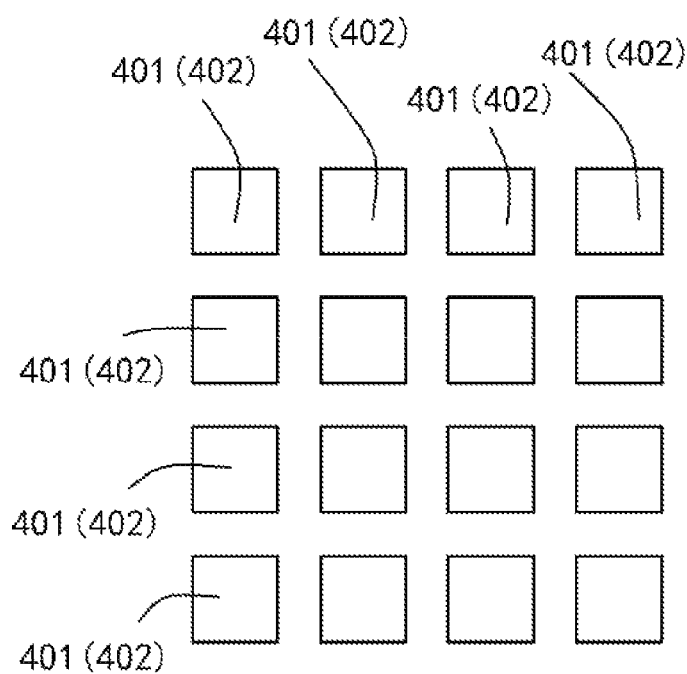
FIG. 5 is a top view of another first cathode structure and a first metal structure according to an exemplary implementation in FIG. 2.

FIG. 2 is a side view of the OLED touch panel, wherein the cathode layer 101 and the metal layer 103 that is spaced from the cathode layer 101 may be shown. As shown in FIG. 5, the cathode layer 101 may include a plurality of first cathode structures 401 that are provided at a distance from each other, and the metal layer 103 may include a plurality of first metal structures 402 that are provided at a distance from each other. According to one implementation of the present disclosure, projections of the first cathode structure 401 and the first metal structure 402 on the glass substrate 106 at least partially coincide, wherein an arrow direction may be a projection direction. The first metal structure 402 and the first cathode structure 401 are electrically connected to an integrated circuit, respectively, such that a mutually capacitive touch function can be realized. Compared with the OLED touch panel in the related art, the OLED touch panel as provided by the present disclosure can decrease the height so as to achieve a thinner profile.

Referring to FIG. 1 to FIG. 5, according to one specific implementation of the present disclosure, the cathode layer 101 may include a plurality of first cathode structures 401 that are spaced from each other. According to one specific implementation of the present disclosure, the plurality of the first cathode structure 401 may be uniformly arranged, but not limited thereto. A distance between the first cathode structures 401 may be adjusted according to actual requirements, which is within the protection scope of the present disclosure.

Figure 4:
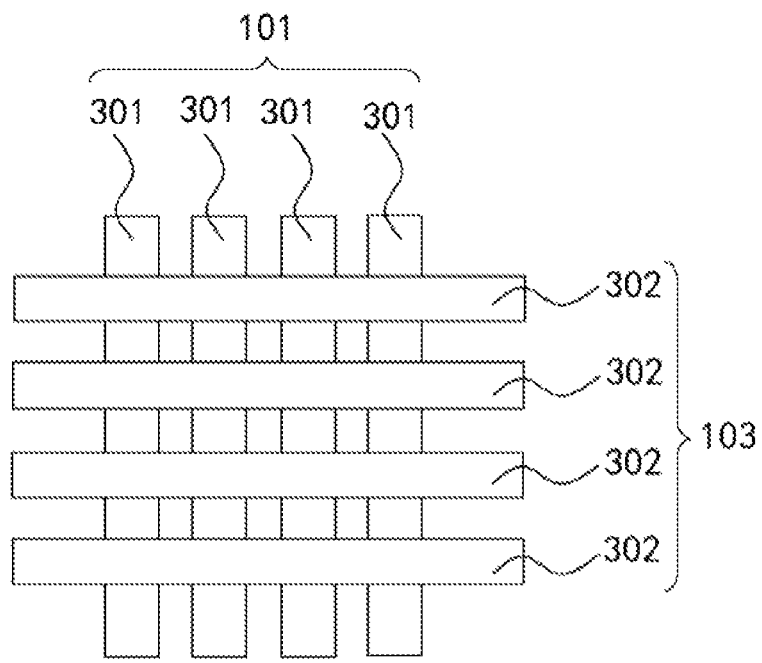
FIG. 4 is a top view of a first cathode structure and a first metal structure according to an exemplary implementation in FIG. 2.

FIG. 4 is a top view of the cathode layer and the metal layer as provided by one specific implementation of the present disclosure. The cathode layer 101 may further include a second cathode structure 301. The metal layer 103 may further include a second metal structure 302. Both the second cathode structure 301 and the second metal structure 302 are bar-shaped, and the projections of the second cathode structure 301 and the second metal structure 302 on the glass substrate 106 may coincide, wherein the first cathode structure 401 may be disposed in the coincident area of the second cathode structure 301, and the first metal structure 402 may be disposed in the coincident area of the second metal structure 302.

According to one specific implementation of the present disclosure, the first cathode structure 401 may also be configured as a bar-shaped structure. A length of the first cathode structure 401 is as same as a length of the second cathode structure 301. According to one specific implementation of the present disclosure, a width of the first cathode structure 401 may be less than or equal to a width of the second cathode structure 301, which is within the protection scope of the present disclosure. In the case that the width of the first cathode structure 401 is less than the width of the second cathode structure 301, an area of the second cathode structure 301, where the first cathode structure is not disposed, may be made of insulating materials, etc., and may be selected according to actual requirements, which all within the protection scope of the present disclosure. In FIG. 4, it shows an embodiment that the first cathode structure 401 and the second cathode structure 301 have the same length and also have the same width.

According to another specific implementation of the present disclosure, the first cathode structure 401 may be block-shaped. In an extension direction of the second cathode structure 301, the length of the first cathode structure 401 may be equal to the length between the plurality of coincident areas adjacent to each other, may be the length of one coincident area, and also the length of the partially coincident area, which all are within the protection scope of the present disclosure. According to one specific implementation of the present disclosure, an area of the first cathode structure 401 may be less than or equal to an area of the coincident area. FIG. 5 shows an embodiment that the area of the first cathode structure 401 is equal to the area of the coincident area, wherein the first cathode structure 401 may be rectangular, but not limited thereto, and may be selected according to actual requirements, for example, but not limited to a circular structure and a triangular structure, etc., which all are within the protection scope of the present disclosure. According to one specific implementation of the present disclosure, each of the second cathode structure 301 may be provided with a plurality of first cathode structures 401 that are presented in a block shape and may be uniformly arranged. According to one specific implementation of the present disclosure, an area on the same second cathode structure 301, where the first cathode structure is not disposed, may be provided with insulating materials, or includes other structures that may be selected according to actual requirements, which all are within the protection scope of the present disclosure.

According to one specific implementation of the present disclosure, the first cathode structure 401 may be made of a magnesium silver alloy, but not limited thereto, and may be selected according to actual requirements, which is within the protection scope of the present disclosure. According to one specific implementation of the present disclosure, the first cathode structure 401 can be made in a vapor deposition manner, but not limited thereto.

Further referring to FIG. 1 to FIG. 5, according to one implementation of the present disclosure, the cathode layer 101 may include a plurality of second cathode structures 301 spaced from each other. The second cathode structure 301 may have a first extension direction, and the first cathode structure 401 may be disposed on the second cathode structure 301. Further referring to FIG. 1 to FIG. 5, according to one implementation of the present disclosure, the plurality of first cathode structures 401 may have the same width, and may be disposed at an equal interval, which are all within the protection scope of the present disclosure.

Further referring to FIG. 1 to FIG. 5, according to one specific implementation of the present disclosure, the metal layer 103 may be disposed on the side of the cathode layer 101 that is far away from the glass substrate 106. In FIG. 1 and FIG. 2, the metal layer 103 is disposed on the top of the OLED control panel. The metal layer 103 may be spaced from the cathode layer 101. An insulating layer 102 may be disposed between the metal layer 103 and the cathode layer 101. According to one implementation of the present disclosure, the insulating layer 102 may be made of silicon nitride or other organic materials.

Further referring to FIG. 1 to FIG. 5, according to one specific implementation of the present disclosure, the metal layer 103 may include a plurality of first metal structures 402 spaced from each other. The projection of the first cathode structure 401 on the glass substrate 106 may coincide or partially coincide with the projection of the first metal structure 402 on the glass substrate 106. The arrow direction in FIG. 2 may indicate the projection direction of the first cathode structure 401 and the first metal structure 402. According to one specific implementation of the present disclosure, the first metal structure 402 and the first cathode structure 401 may have the same shape, which is not limited thereto and within the protection scope of the present disclosure. According to one implementation of the present disclosure, the first metal structure 402 may be made of two titanium film layers spaced from each other and an aluminum film layer sandwiched between the two titanium film layers, which is not limited thereto and may be selected according to actual requirements. The titanium film layer may be disposed on the insulating layer 102, and the aluminum film layer may be disposed on the side of the titanium film layer that is far away from the insulating layer 102. According to one implementation of the present disclosure, the metal layer 103 may be formed by using a physical vapor deposition process and a photolithography process. According to one specific implementation of the present disclosure, the insulating layer 102 may also be an existing thin-film packaging structure, as long as the metal layer 103 can be isolated from the cathode layer 101, which is within the protection scope of the present disclosure.

Further referring to FIGS. 1-5, according to one specific implementation of the present disclosure, the metal layer 103 may include a plurality of second metal structures 302 spaced from each other. The second metal structure 302 may have a second extension direction. The first extension direction may be disposed at an angle to the second extension direction. The first metal structure 402 is disposed on the second metal structure 302. The angle between the first extension direction and the second extension direction may be selected according to actual requirements. According to one specific implementation of the present disclosure, the angle may be selected from 75° to 105°, for example, 80° and 90°. According to one implementation of the present disclosure, the first extension direction of the second cathode structure 301 may be perpendicular to the second extension direction of the second metal structure 302. FIG. 4 shows one specific implementation of the second metal structure 302. The first metal structure 402 may be in a bar or block shape, and the first metal structure 402 may be disposed on the second metal structure 302. The first metal structure 402 in a bar shape is similar to the first cathode structure 401 in a bar shape. The first metal structure 402 in a block shape is similar to the first cathode structure 401 in a block shape, but omitted herein.

Further referring to FIGS. 1-5, according to one specific implementation of the present disclosure, the first metal structure 402 may be uniformly disposed on the metal layer 103. A plurality of first metal structures 402 may have the same width, and may be disposed at an equal interval, which are all within the protection scope of the present disclosure. In the case where the first metal structure 402 is in a block shape, the first metal structures 402 may be uniformly arranged on the same second metal structure 302.

According to one implementation of the present disclosure, the OLED touch panel may further include an integrated circuit. The first cathode structure 401 and the first metal structure 402 may be electrically connected to the integrated circuit respectively to be simultaneously driven by the integrated circuit.

According to the present disclosure, the cathode layer 101 of the OLED touch panel is formed as a part of the touch structure, and one layer of an insulating layer 102 is formed, and a metal layer 103 is added on the insulating layer 102, such that the cathode layer 101 and the metal layer 103 form a capacitance so as to obtain a mutual capacitance sensor. In this way, the touch structure can be embedded in the OLED touch panel. On the one hand, compared with the OLED touch panel in the prior art, the OLED touch panel as provided by the present disclosure may decrease its height to achieve a thinner profile. On the other hand, the OLED touch panel may save costs because the externally attached touch module is eliminated.

In particular, firstly, the cathode layer 101 is formed by a magnesium silver alloy by using a mask having a predetermined shape and by the way of a vapor deposition. It can be understood that the predetermined shape may be a plurality of evenly arranged rectangular through holes formed on the mask, and thus the cathode layer 101 may be formed to have a plurality of first cathode structures 401 that are evenly arranged and in a block shape. In addition, the mask may also be configured to have a plurality of bar-shaped through holes, so that the cathode layer 101 is formed to have a plurality of first cathode structures 401 that are arranged in the bar shape, which are within the protection scope of the present disclosure. The specific shapes of the mask may be selected according to the actual requirements.

Secondly, after the cathode layer 101 is completed, an insulating layer 102 may be formed on the cathode layer 101. The manufacturing process of the insulating layer 102 may be selected according to actual requirements, which is within the protection scope of the present disclosure.

Further, a metal layer 103 may be formed on the insulating layer. A large-area metal layer 103 may be formed by a physical vapor deposition process, and then the first metal structure 402 may be formed by a photolithography process.

Finally, the cathode layer 101 and the metal layer 103 may be wired respectively to be electrically connected to the integrated circuit, respectively, so that a mutual capacitive touch function can be realized.

As can be known from the above technical solutions, advantages and positive effects of the OLED touch panel of the present disclosure are: the cathode layer of the OLED touch panel is provided with a plurality of first cathode structures spaced from each other, and the metal layer that is configured to insulate from the cathode layer is provided with first metal structures corresponding to the positions of the first cathode structures, and the first metal structures and the first cathode structures are respectively electrically connected to the integrated circuit, such that the mutual capacitive touch function can be achieved. As compared with the OLED touch panel in the prior art, the OLED touch panel as provided by the present disclosure may decrease the its height so as to obtain a thinner profile. Furthermore, since the OLED touch panel as provided by the present disclosure does not need to be attached with an external touch module, the manufacturing cost is reduced in comparison with the prior art.

The foresaid features, structures, or characteristics may be combined in one or more embodiments in any suitable manner. Numerous specific details as above described are provided for fully understanding the embodiments of the present disclosure. However, it will be acknowledged for the person skilled in the art that the technical solutions of the present disclosure practiced without one or more of the specific details, or by using other methods, components, materials, etc. may be employed. In other instances, well-known structures, materials, or operations are not shown or described in detail to avoid obscuring various aspects of the present disclosure.

What is claimed is:

1. An OLED touch panel, comprising:
    an array substrate structure;
    a cathode layer, provided on the array substrate structure and comprising a plurality of first cathode structures spaced from each other;
    an insulating layer, disposed on the cathode layer; and
    a metal layer, disposed on a side of the insulating layer far away from the cathode layer and comprising a plurality of first metal structures spaced from each other, wherein a projection of the first cathode structure on the array substrate structure at least partially coincides with a projection of the first metal structure on the array substrate structure;
    wherein the cathode layer further comprises a plurality of second cathode structures spaced from each other, the second cathode structure has a first extension direction, and the first cathode structure is disposed on the second cathode structure; and/or
    the metal layer comprises a plurality of second metal structures spaced from each other, the second metal structure has a second extension direction, the first extension direction is disposed at an angle to the second extension direction, and the first metal structure is disposed on the second metal structure; and
    wherein in the first extension direction, a size of the first cathode structure is smaller than a size of the second cathode structure; and a plurality of the first cathode structures are disposed on the second cathode structure, and are disposed sequentially in the first extension direction; and/or
    in the second extension direction, a size of the first metal structure is smaller than a size of the second metal structure; and a plurality of the first metal structures are disposed on the second metal structure, and are disposed sequentially in the second extending direction.

2. The OLED touch panel according to claim 1, wherein each of the second cathode structure and the second metal structure are in a bar shape.

3. The OLED touch panel according to claim 2, wherein in the first extension direction, a size of the first cathode structure is equal to a size of the second cathode structure; and/or
    in the second extension direction, a size of the first metal structure is equal to a size of the second metal structure.

4. The OLED touch panel according to claim 3, wherein each of the first cathode structure and the first metal structure are in a bar shape.

5. The OLED touch panel according to claim 1, wherein each of the first cathode structure and the first metal structure are in a block shape.

6. The OLED touch panel according to claim 1, wherein the first extension direction of the second cathode structure is perpendicular to the second extension direction of the second metal structure.

7. The OLED touch panel according to claim 1, wherein the cathode layer is made of a magnesium silver alloy.

8. The OLED touch panel according to claim 1, further comprising an integrated circuit, and the first cathode structure and the first metal structure are electrically connected to the integrated circuit, respectively.

9. The OLED touch panel according to claim 1, wherein the first metal structure comprises two titanium film layers spaced from each other and an aluminum film layer located between the titanium film layers, and planes wherein the titanium film layer and the aluminum film layer are disposed are parallel to a plane where the cathode layer is disposed.

10. The OLED touch panel according to claim 1, wherein the metal layer is formed by using a physical vapor deposition process and a photolithography process.

11. A method for manufacturing an OLED touch panel comprising the following steps:
    forming a cathode layer comprising a plurality of first cathode structures on an array substrate structure;
    forming an insulating layer on the first cathode structure; and
    forming a metal layer on the insulating layer;
    wherein the cathode layer further comprises a plurality of second cathode structures spaced from each other, the second cathode structure has a first extension direction, and the first cathode structure is disposed on the second cathode structure; and/or
    the metal layer comprises a plurality of second metal structures spaced from each other, the second metal structure has a second extension direction, the first extension direction is disposed at an angle to the second extension direction, and the first metal structure is disposed on the second metal structure; and
    wherein in the first extension direction, a size of the first cathode structure is smaller than a size of the second cathode structure; and a plurality of the first cathode structures are disposed on the second cathode structure, and are disposed sequentially in the first extension direction; and/or in the second extension direction, a size of the first metal structure is smaller than a size of the second metal structure; and a plurality of the first metal structures are disposed on the second metal structure, and are disposed sequentially in the second extending direction.

12. The method for manufacturing the OLED touch panel according to claim 11, wherein the step of forming a first cathode structure on an array substrate structure comprises: forming the first cathode structure on the array substrate structure by using a mask and by means of a vapor evaporation.

13. The method for manufacturing the OLED touch panel according to claim 12, wherein the step of forming a metal layer on the insulating layer comprises: forming a metal layer on the insulating layer by using a physical vapor deposition process, and then using photolithography process such that the metal layer is formed to have a first metal structure.

14. The method for manufacturing the OLED touch panel according to claim 13, further comprising:
    providing an integrated circuit, with wiring on the cathode layer and the metal layer, respectively, such that the first cathode structure and the first metal structure are electrically connected to the integrated circuit, respectively.

* * * * *